(12) United States Patent
Ishii

(10) Patent No.: US 6,853,537 B2
(45) Date of Patent: Feb. 8, 2005

(54) ELECTROLYTIC CAPACITOR AND A FUEL CELL DRIVE CAR USING THE CAPACITOR

(75) Inventor: Kazuo Ishii, Sugimani-ku (JP)

(73) Assignee: Jelmax Company, Ltd., Minato-ku (JP)

( * ) Notice: Subject to any disclaimer, the term of this patent is extended or adjusted under 35 U.S.C. 154(b) by 0 days.

(21) Appl. No.: 10/463,377

(22) Filed: Jun. 18, 2003

(65) Prior Publication Data

US 2004/0184220 A1 Sep. 23, 2004

(30) Foreign Application Priority Data

Mar. 20, 2003 (JP) ........................................ 2003-078404

(51) Int. Cl.[7] ................................................ H01G 9/00
(52) U.S. Cl. ....................... 361/512; 361/502; 361/504; 361/508; 361/509; 361/523; 361/528
(58) Field of Search ................................. 361/512, 510, 361/502, 504, 508, 509, 516, 519, 523, 525, 528, 511, 520, 527, 433, 503, 518, 524, 515; 29/25.03

(56) References Cited

U.S. PATENT DOCUMENTS

| | | | |
|---|---|---|---|
| 5,057,972 A | | 10/1991 | Ishii |
| 5,485,346 A | * | 1/1996 | Kanbara et al. ............. 361/504 |
| 6,249,423 B1 | * | 6/2001 | O'Phelan et al. ........... 361/502 |
| 6,411,496 B1 | * | 6/2002 | Suhara et al. ............... 361/502 |

* cited by examiner

Primary Examiner—Dean A. Reichard
Assistant Examiner—Nguyen T. Ha
(74) Attorney, Agent, or Firm—Banner & Witcoff, Ltd

(57) ABSTRACT

Electrolytic capacitor for of a high voltage and a high capacity is provided, which is suited for an auxiliary power supply of a fuel cell vehicle. A cathode and an anode foil are arranged to face each other. A dielectric film may be provided on the surface of the anode foil. The anode foil and the cathode foil 4 are wound into a roll, with a compound separator including the first and second separators and arranged there between. In the compound separator, electrolyte is impregnated and conductive fine particles are dispersed in the second separator.

9 Claims, 5 Drawing Sheets

ELECTROLYTIC CAPACITOR AND A FUEL CELL DRIVE CAR USING THE CAPACITOR

CROSS-REFERENCE TO RELATED APPLICATIONS

This application is based upon and claims the benefit of priority from the prior Japanese Patent Application No. 2003-078404 filed on Mar. 20, 2003; the entire contents of which are incorporated herein by reference.

BACKGROUND OF THE INVENTION

The present invention relates to an electrolytic capacitor which can be rapidly charged and discharged with electric charge of high voltage and large capacity, and more particularly to an electrolytic capacitor used as an auxiliary power source for cars or other vehicles which use fuel cells as a power source.

In recent years, development of fuel cell vehicles (FC vehicles) is very rapid. A fuel cell for the FC vehicles is supplied with high-pressure hydrogen as fuel and is used as a power source replacing a gasoline engine. This FC vehicle uses the DC electric power which is generated by the fuel cell, and drives DC motors directly. Thus, it attracts attention all over the world as a most efficient power source. In such an FC vehicle, a system using an electrolytic capacitor of a large capacity as a source of auxiliary power is proposed in order to supplement a large power required at the time of the start of vehicles. The electrolytic capacitor of a large capacity is charged with an electric power from the fuel cell while the vehicle is running and is charged with an electric energy converted from a kinetic energy recovered at the time of braking. The electric power thus charged is discharged from the electrolytic capacitor and is supplied to the DC motor together with the electric power from a fuel cell at the time of the start of vehicles.

However, few of the conventional electrolytic capacitors instanteneously discharge the charges stored, because they have an ion conduction structure. That is, generally, conventional electrolytic capacitors need a long time for charging and discharging. Instantaneous movement of a large electric charge gives strong ion bombardment against the cathode. As a result, heat and a lot of hydrogen gas are generated from a surface of the cathode, which shortens the life of the capacitor remarkably. Furthermore, there are still many room of improvements in a withstand voltage of the electrolytic capacitors, because few of conventional ones have a withstand voltage of exceeding 500 V.

Therefore, it is an object of the present invention to provide a new electrolytic capacitor having charge and discharge characteristics of a high voltage and a high capacitance, which is indispensable for the capacitor used for an auxiliary power supply of a fuel cell.

It is another object of the present invention to provide an electrolytic capacitor, which realizes higher moving speed of internal electrons during charging and discharging than any of conventional electrolytic capacitors.

It is yet other object of the present invention to provide an electrolytic capacitor, in which there is no ion bombardment against the cathode at the time of instantaneous movement of a large electric charge and which enables a high speed storing of the electric charge recovered.

BRIEF SUMMARY OF THE INVENTION

An electrolytic capacitor according to the invention includes, an anode foil and a cathode foil, which are provided facing each other, a dielectric film provided on the surface of the anode foil, an ion permeable compound separator including a first and a second separator paper, which are arranged between the anode foil and the cathode foil, an electrolyte impregnated in the compound separators, and conductive fine particles dispersed in the second separator paper, which contacts with the cathode foil of the ion permeable compound separator, wherein, the anode foil, the dielectric film, the cathode foil and the ion permeable compound separator are together rolled into a cylindrical body.

In the electrolytic capacitor according to the present invention, the ion permeable compound separator is composed of a first and second separator paper made of natural fiber, which are manufactured to form an integral sheet of paper, and the fiber density of the first paper contacting with the dielectric film which is provided on the surface of the anode foil is higher than the fiber density of the second separator paper.

In the electrolytic capacitor according to the invention, the anode foil and the cathode foil are aluminum foil, the dielectric film is an oxide film formed on the surface of the anode aluminum foil, and the conductive fine particles are graphite particles.

An electrolytic capacitor according to the invention includes, a pair of electrode foils, a dielectric film provided on the surface of one of the electrode foils, an ion permeable compound separator including a first and a second separator paper, which are interposed between the pair of electrode foils, an electrolyte being impregnated in the first and the second separator paper of the compound separator, and conductive fine particles dispersed in the second separator paper of the ion permeable compound separator.

In the electrolytic capacitor according to the invention, the pair of foils are an anode foil and a cathode foil, the dielectric film is formed on the anode foil, and the second separator of the ion permeable compound separator is in contact with the cathode foil.

In the electrolytic capacitor according to the invention, the anode foil, the dielectric film, the cathode foil and the ion permeable compound separator are rolled together into a cylindrical body.

In the electrolytic capacitor according to the invention, the first and second separator paper of the ion permeable compound separator are papers made of natural fiber, and the fiber density of the first separator paper contacting with the dielectric film which is provided on the surface of the anode foil is higher than the fiber density of the second separator paper.

In the electrolytic capacitor according to the invention, the first and second separator papers are manufactured to form an integral sheet of paper.

A fuel cell driven car according to the present invention includes a vehicle having a drive wheel, a fuel cell mounted on the vehicle, a motor driven by the fuel cell, and an electrolytic capacitor connected with the motor and the fuel cell through a polarity switching means, the electrolytic capacitor being the electrolytic capacitors claimed in any one of the claim 1 to claim 3, wherein charge stored in the electrolytic capacitor is supplied as a current to the motor through the switching means when the vehicle starts, and an output current of the fuel cell or a current generated by the motor is supplied to the electrolytic capacitor for charging when the vehicle is running and is braked.

BRIEF DESCRIPTION OF THE DRAWINGS

1A is a developed perspective view, and FIG. 1B is the sectional view along the A–A' line in the figure FIG. 1A.

FIG. 4A and FIG. 4B are graphs showing frequency characteristics of the electrolytic capacitor according to the present invention compared with the conventional electrolytic capacitor, wherein FIG. 4A is a frequency vs. impedance characteristic graph, and FIG. 4B is a frequency vs. E.S.R. characteristic graph.

DETAILED DESCRIPTION OF THE INVENTION

The embodiment of the invention will be explained in detail referring to the accompanying figures.

Figure 1A:
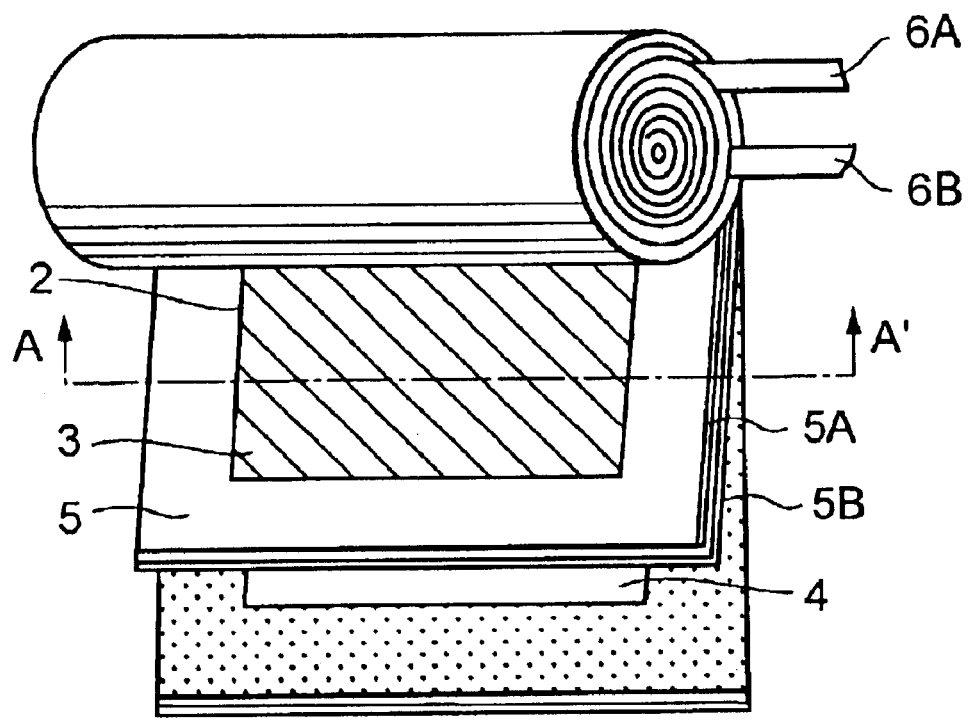
FIG. 1A and FIG. 1B are views showing an electrolytic capacitor according to the present invention, wherein FIG.
Figure 1B:
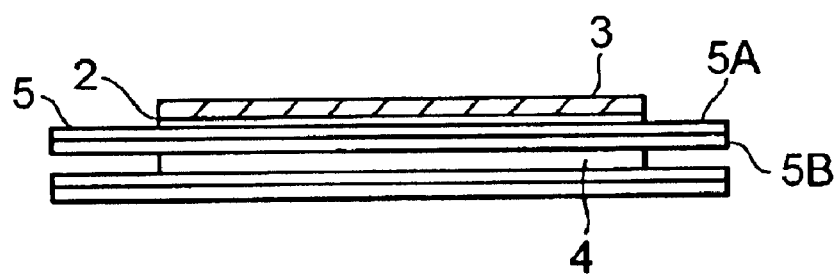

FIG. 1A and FIG. 1B are views showing an electrolytic capacitor according to the present invention, wherein FIG. 1A is a developed perspective view, and FIG. 1B is the sectional view along the A–A' line in the figure FIG. 1A.

As shown in FIG. 1A, an anode foil 3 and a cathode foil 4 are arranged to face each other. On the lower side of foils 3, a dielectric film 2 is provided. The anode foil 3 and the cathode foil 4 are made of, for example, aluminum, and the dielectric film 2 is an oxide film formed by oxidizing the surface of the anode aluminum foil.

An ion permeable compound separator 5 is arranged between the anode foil 3 and cathode foil 4. The ion permeability compound separator 5 consists of a first separator paper 5A and a second and separator paper 5B, which are ion permeable capacitor papers such as Manila papers and the like comprising natural fibers as a main component and are manufactured to form into an integral sheet of paper. A fiber density of the first separator paper 5A contacting with the dielectric film 2 is higher than the fiber density of the second separator paper 5B. The first and second separator papers 5A and 5B of the compound separator 5 are impregnated with electrolyte. Conductive fine particles (shown as 12 in FIG. 2) are distributed in the second separator paper 5B, which is in contact with the cathode foil 4. The conductive fine particles are so distributed that each particle is not in contact with each other.

As shown in FIG. 1B showing a section of the electrolytic capacitor thus constructed along a line A–A' in FIG. 1A, the compound separator 5 is inserted between the anode foil 3 and the cathode foil 4, with a side of the anode foil 3 where the dielectric film 2 is provided being in contact with the compound separator 5.

The anode foil 3, the cathode foil 4 and the ion permeable compound separator 5 that lies between them are wound into a roll like a cylindrical pipe, as shown in FIG. 1A. Tabs 6A and 6B are leads connected to the anode foil 3 and the cathode foil 4, which are led out of the roll respectively.

Figure 2:
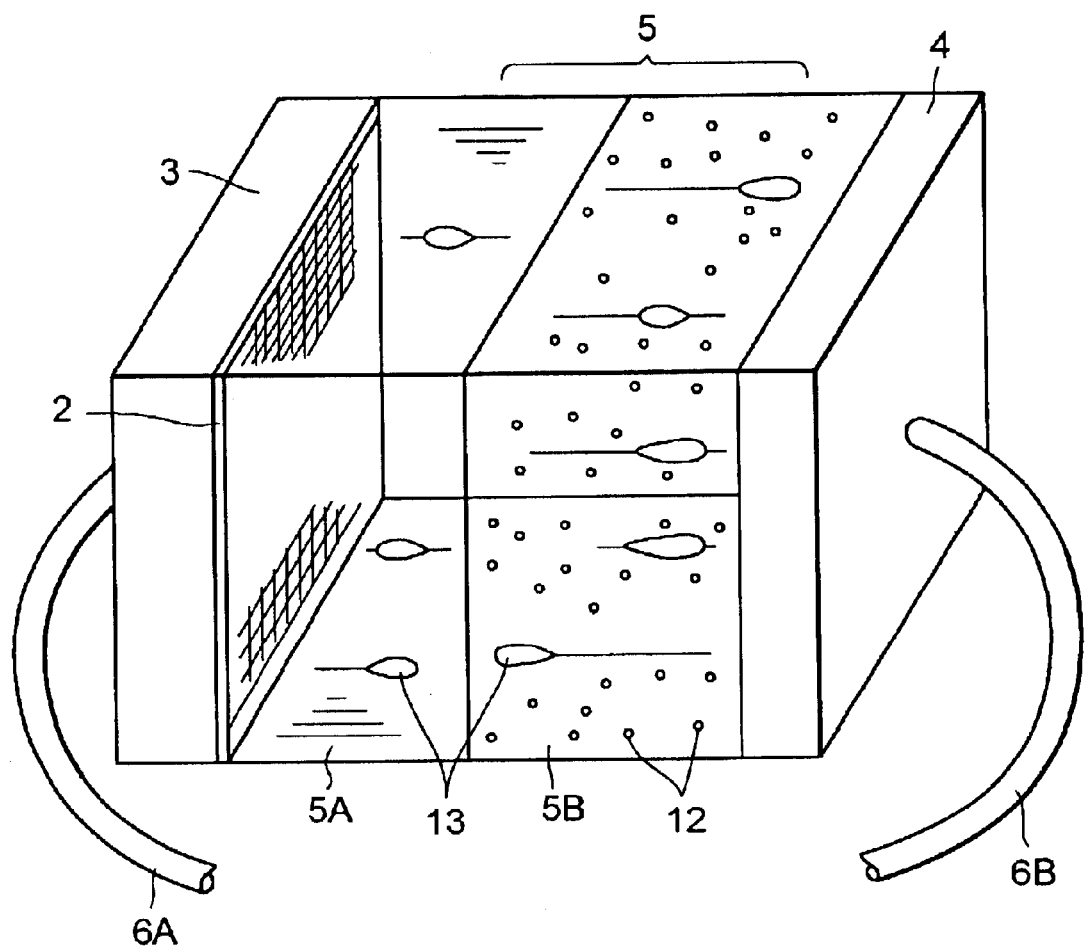
FIG. 2 is a schematic perspective view showing a function of the electrolytic capacitor according to the present invention.

FIG. 2 is a schematic figure for explaining an operating function of the electrolytic capacitor described above. In FIG. 2, the anode 3 and the cathode 4 correspond to the anode foil 3 and the cathode foil 4 respectively, shown in FIG. 1. The dielectric film 2 is formed on the inside of the anode 3. The compound separator 5 lies between the dielectric film 2 and cathode 4. The first separator paper 5A is made of mainly natural fiber, which is in contact with the anode 3. The second separator paper 5B is in contacting with the cathode 4. The first separator paper 5A and the second separator paper 5B are manufactured to form an integral sheet of paper.

Electrolyte is impregnated inside the separator papers 5A and 5B, and conductive fine particles 12 are distributed almost uniformly in the second separator paper 5B. That is, the conductive fine particles 12, such as graphite fine particles, are distributed in the position isolated from the dielectric film 2 of the anode 3 by the first separator paper 5A composed of natural fiber. With particle size and degree of distribution of the conductive fine particles 12 being selected as a predetermined value, ions (not illustrated) stops moving in the electrolyte impregnated in the compound separator 5 and electrons 13 dissociates from the ions moving with super high speed according to the potential difference between the anode 3 and the cathode 4. The amount of the graphite fine particles distributed is preferable to be between 0.5 and 7% by weight of the second separator paper 5B. This phenomenon is developed by the inventor of the present invention and is realized in the electrolytic capacitor marketed with a trademark "Black Gate".

On the other hand, the ions and electrons exist together in the portion of first separator paper 5A, where the conductive fine particles 12 do not exist and is a storehouse of an electronic current for providing an instantaneous large current.

Since the ion has stopped moving in the electrolytic capacitor according to the present invention, neither ion bombardment of the cathode nor generation of hydrogen on the cathode surface occur. Thus there is no consumption of the cathode and a long life can be secured.

Furthermore, although the positive voltage of 700V–800V is applied on the anode, 3 in the case of high voltage large current, the withstand voltage is not spoiled since the conductive fine particles 12 are not distributed in the portion of first separator paper 5A. Therefore, high voltage discharge current can be taken out from the anode 3 and the cathode 4 through leads 6A and 6B.

Figure 3:
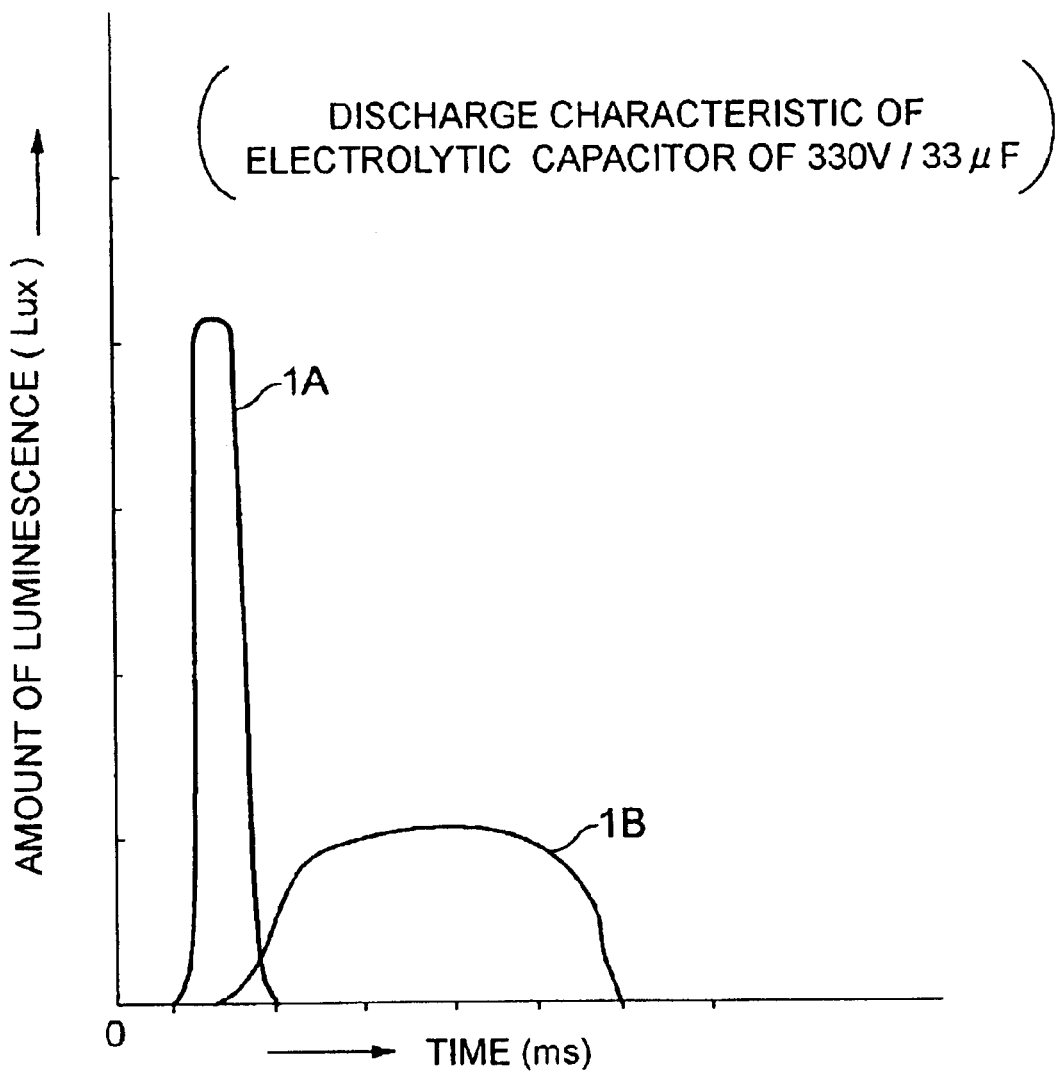
FIG. 3 is a graph showing an electric discharge characteristic of the electrolytic capacitor according to the present invention compared with the conventional electrolytic capacitor.

FIG. 3 is a graph, which comparatively shows the electric discharge characteristics of the electrolytic capacitor according to the present invention manufactured in a way described and a conventional electrolytic capacitor with a rate of 330V and 33 $\mu$F manufactured according to nearly the same specification as that of the present invention. The curve 1A is the characteristic curve of the electrolytic capacitor according to the present invention and the curve 1B is the characteristic curve of the conventional one.

Measurement of the electric discharge characteristic is performed by an optical method using stroboscope equipment. Results of the measurement are shown by curves indicating an amount of luminescence to luminescent (electric discharge) time. A remarkable difference is found in the resultant graph of the measurement. That is, according to the curve 1A, an electric discharge time is very short and peak energy is very high. On the other hand, according to curve 1B showing conventional one, the electric discharge time is several times as long as that of the curve 1A. The peak energy is also extremely small compared with curvilinear 1A, that is, it is as several or less times as small as that of the curve 1A. Since areas within the curve 1A and curve 1B are equal due to the equal amount of electric charge stored, the peak value of curve 1A is about 10 times as high as the peak value of curve 1B in fact.

It is clearly shown by the measurement data that the electrolytic capacitor according to the present invention is fully satisfying the electric power demand of the fuel cell vehicles requiring at the time of start for supplying large current in a short time.

As described, the technology used in the electrolytic capacitor having the trade mark "Black Gate" is applied as an electrolytic capacitor having the electric discharge characteristic of curvilinear 1A. The inventor of the present invention is the first who observed and applied such super high-speed electric discharge characteristic to the fuel cell vehicles.

As described, it is assumed in the electrolytic capacitor according to the present invention that the ions stop moving, and the electrons otherwise carried by ions are separated from the ions to move at super high speed, if the particle size and the degree of distributed conductive particles are selected as a certain value in a separator. The inventor calls this new phenomenon as "transcendent electron conduction" because ordinary frequency characteristic of based on the ion conduction has a limit of about 100 kHz, and this phenomenon, however, raises the limit to 10 GHz (100,000 times) all at once. It is assumed that the electric discharge curve of FIG. 3 is also based on the above phenomenon.

Figure 4A:
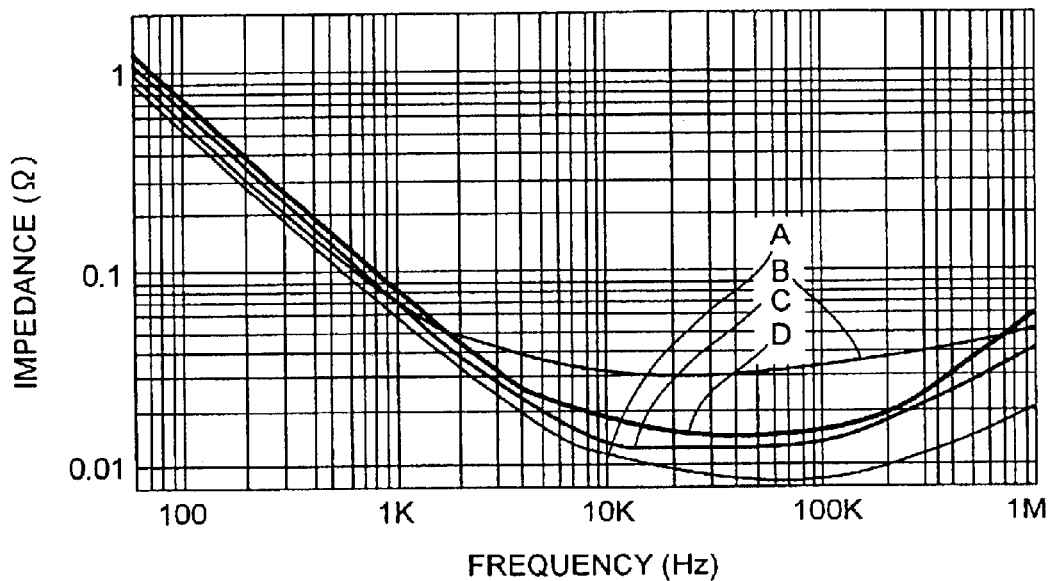
Figure 4B:
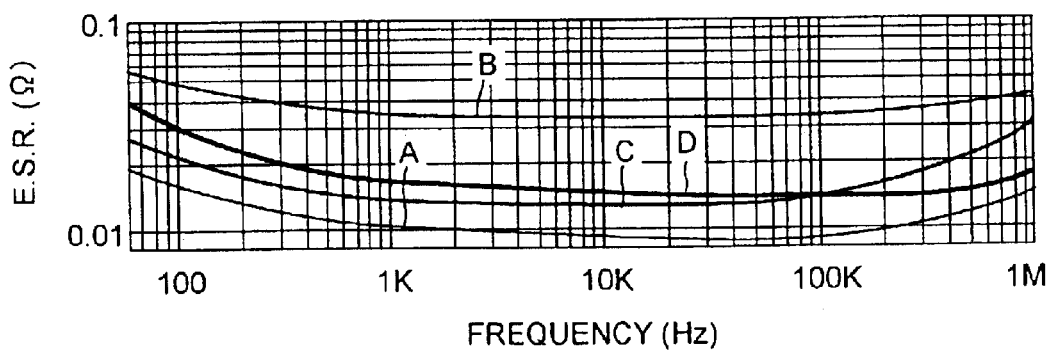

FIG. 4A and FIG. 4B are graphs showing frequency characteristics of the electrolytic capacitor according to the present invention compared with the conventional electrolytic capacitor, wherein FIG. 4A is a graph showing a frequency characteristic of the impedance, and FIG. 4B is a graph showing a frequency characteristic of the E.S.R. (equivalent series resistance). These figures show comparison of power of the electrolytic capacitor according to the present invention with the conventional one. In the figures, curves A, B, C, and D are the frequency characteristic curves of the electrolytic capacitors, wherein the curve A is the electrolytic capacitor according to the present invention having a structure described and comparatively large capacity of, for example 63 V and 2200 $\mu$F. The curve B (manufactured by NIPPON CHEMI-CON), the curve C (manufactured by Elna), and the curve D (manufactured by Matsushita) are the electrolytic capacitors manufactured by three companies and put on the general market. The sizes of these electrolytic capacitors for comparison from A to D are as follows.

A: 30 mm×50 mm
B: 25 mm×40 mm
C: 30 mm×70 mm
D: 35 mm×54 mm

Although these are almost the same sizes, the frequency characteristics differ remarkably. Namely, although the curve A shows the minimum value both in the impedance and in the "E.S.R." characteristic, other curves B, C, and D are about 10 times as high as the curve A. Especially with respect to the comparison of "E.S.R" value at the extremely low frequency band, which is necessary for a fuel cell vehicle, the curve A has a value of about 1/10 as low as any of curvilinear B, C, and D. This fact means that there is a big difference of about 10 times of the electric discharge current among the electrolytic capacitors having the same capacity. The reason is considered to be the achievement of the transcendent electron conduction in the electrolytic capacitor according to the present invention described above.

The fuel cell vehicle using the electrolytic capacitor according to the present invention is explained by reference to FIG. 5. The figure is a circuit diagram showing an electric system of the fuel cell vehicle, which is provided with the electrolytic capacitor according to the present invention.

Figure 5:
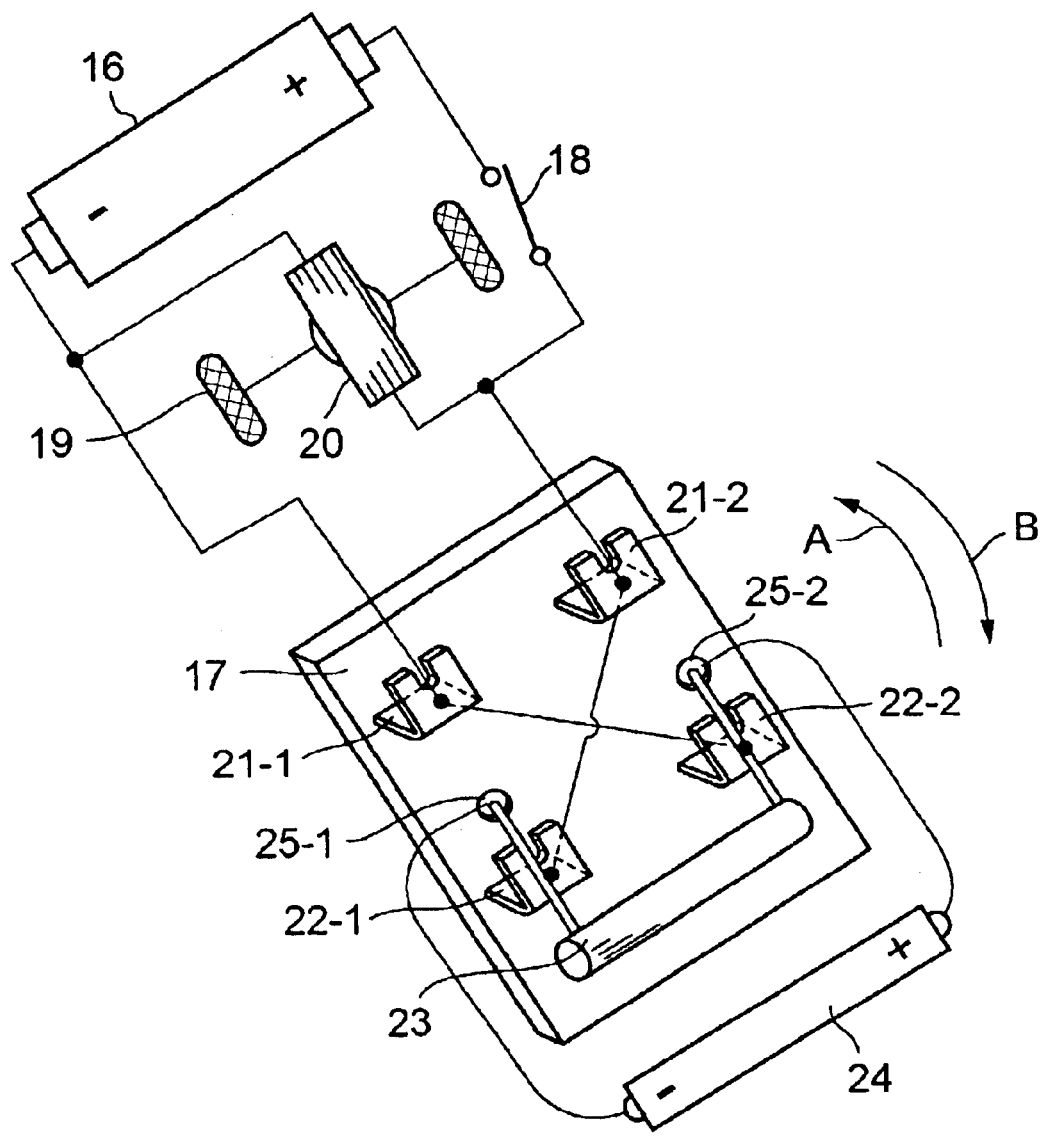
FIG. 5 is a circuit diagram showing an electric circuit for a fuel cell vehicle, which is provided with the electrolytic capacitor according to the present invention.

In FIG. 5, a DC voltage generated by a fuel cell 16 is applied to a DC motor 20, which drives a driving wheel 19 through a switching contact 18 of a polarity switching means 17. The polarity switching means 17 has first switching contacts 21-1 and 21-2, to which the output current of the fuel cell 16 is supplied. The polarity switching means 17 also has second switching contacts 22-1 and 22-2, by which crossover connection is made with the first switching contacts, and has a change lever 23. The change lever 23 pivots on fulcrums 25-1 and 25-2 in the direction shown by arrows A and B to which both terminals of the electrolytic capacitor 24 according to the present invention is connected. The electrolytic capacitor 24 is thus selectively connected to the first switching contact 21-1, 21-2 and the second switching contact 22-1, 22-2 by the change lever 23.

Operation of the fuel cell vehicle thus configured is explained. At the time of starting of the fuel cell vehicle, the change lever 23 of the polarity switching means 17 closes the switching contact 18 while it turns in the direction of arrow A and contacts with the first switching contact 21-1 and 21-2. Thus an output current of the fuel cell 16 is supplied to the DC motor 20, and the electric charge, which has been charged in the electrolytic capacitor 24 is discharged at a stroke to be supplied to the DC motor 20. Thus, the DC motor 20 rotates and the vehicle starts running. While the vehicle is running, the output current of the fuel cell 16 is supplied to the electrolytic capacitor 24 through the first switching contacts 21-1, 21-2, and through the change lever 23, to recharge the electrolytic capacitor 24.

If brakes are applied during the running of the vehicle, the lever 23 is turned in the direction of arrow B in conjunction with the braking action and is connected to the second switching contacts 22-1 and 22-2. If the fuel cell vehicle is made slow down by applying the brake, the DC motor 20 operates as a dynamo with the braking energy and generates a voltage of reversed polarity between the terminals. The voltage, polarity of which is reversed by the polarity switching means 17 is applied between the terminals of the electrolytic capacitor 24 to charge the capacitor. The kinetic energy of the fuel cell vehicle at the time of a brake is thus recovered as electric energy through the mechanism described.

In a fuel cell vehicle, start and brake operation are usually performed manually. The charge and discharge operation of the electrolytic capacitor 24 caused by the polarity switching means 17 is not later than the operation of the manual operation mechanism since the charge and discharge of the electrolytic capacitor 24 is performed at such high speed as mentioned above. Therefore, the electric system of the fuel cell vehicle according to the present invention is fully applicable to various kinds of automatic driving systems that will be proposed in the future.

According to the electrolytic capacitor of the invention mentioned above, there is neither the ion bombardment to the cathode nor consumption of the cathode, since the movement of the ion does not arise inside the capacitor due to the compound separator of the special structure. Moreover, since there is also no possibility that a lot of hydrogen gas is generated at the cathode, the long life of the capacitor is secured.

Furthermore, discharge of a large current at a high voltage is attained required for the vehicles at the time of start without spoiling withstand voltage, since the conductive particles are not distributed in the anode side of the compound separator.

What is claimed is:

1. An electrolytic capacitor comprising:

an anode foil and a cathode foil, which are provided facing each other, a dielectric film provided on the surface of the anode foil, an ion permeable compound separator including a first and a second separator paper, which are arranged between the anode foil and the cathode foil, an electrolyte being impregnated in the compound separator, and conductive fine particles isolated from the dielectric film and dispersed in the second separator paper of the ion permeable compound separator, which contacts with the cathode foil, wherein, the anode foil, the dielectric film, the cathode foil, and the ion permeable compound separator are rolled together into a cylindrical body.

2. An electrolytic capacitor according to claim 1, wherein the first and second separator paper of the ion permeable compound separator are papers made of natural fiber, and the fiber density of the first separator paper contacting with the dielectric film which is provided on the surface of the anode foil is higher than the fiber density of the second separator paper.

3. An electrolytic capacitor according to claim 2, wherein the first and second separator paper are manufactured to form an integral sheet of paper.

4. An electrolytic capacitor according to claim 3, wherein the anode foil and the cathode foil are aluminum foil, the dielectric film is an oxide film formed on the surface of the anode aluminum foil, and the conductive fine particles are graphite particles.

5. An electrolytic capacitor comprising:

a pair of electrode foils, a dielectric film provided on the surface of one of the electrode foils, an ion permeable compound separator including a first and a second separator paper, which are interposed between the pair of electrode foils, an electrolyte being impregnated in the first and the second separator paper of the compound separator, and conductive fine particles isolated from the dielectric film and dispersed in the second separator paper of the ion permeable compound separator.

6. An electrolytic capacitor according to claim 5, wherein the pair of foils are an anode foil and a cathode foil, and the dielectric film is formed on the anode foil, and wherein the second separator paper of the ion permeable compound separator is in contact with the cathode foil.

7. An electrolytic capacitor according to claim 6, wherein the anode foil, the dielectric film, the cathode foil, and the ion permeable compound separator are rolled together into a cylindrical body.

8. An electrolytic capacitor according to claim 7, wherein the first and second separator paper of the ion permeable compound separator are papers made of natural fiber, and the fiber density of the first separator paper contacting with the dielectric film which is provided on the surface of the anode foil is higher than the fiber density of the second separator paper.

9. An electrolytic capacitor according to claim 8, wherein the first and second separator papers are manufactured to form an integral sheet of paper.

\* \* \* \* \*